March 7, 1944.  J. BOCHENEK  2,343,637

GRINDING FIXTURE

Filed Nov. 2, 1942

INVENTOR
JOSEPH BOCHENEK

BY

ATTORNEYS

Patented Mar. 7, 1944

2,343,637

UNITED STATES PATENT OFFICE 2,343,637

GRINDING FIXTURE

Joseph Bochenek, Milwaukee, Wis.

Application November 2, 1942, Serial No. 464,165

3 Claims. (Cl. 51—216)

This invention appertains to a novel collet fixture for effectively holding and indexing stock and is an improvement on my pending application Serial No. 438,063, filed April 8, 1942.

One of the primary objects of my invention is the provision of novel means arranged directly on the base of the collet fixture and at right angles to the collet spindle for effectively holding work whereby the terminals of such work can be readily and effectively acted upon by a tool.

Another salient object of my invention is the provision of a collet index fixture having embodied directly thereon at one end thereof a vise for clamping work to be operated upon.

Another important object of my invention is the provision of a collet index fixture having novel means on one end thereof for adjustably receiving and holding clamping blocks with an adjustable stirrup carrying a clamping screw for holding the work in the desired position against said blocks.

A further important object of my invention is the provision of novel means for accurately adjusting and turning the collet spindle relative to the dial plate for obtaining an extremely fine adjustment of the work held by the collet.

With these and other objects in view, the invention consists in the novel construction, arrangement and formation of parts, as will be hereinafter more specifically described, claimed and illustrated in the accompanying drawing, in which drawing:

Figure 1:
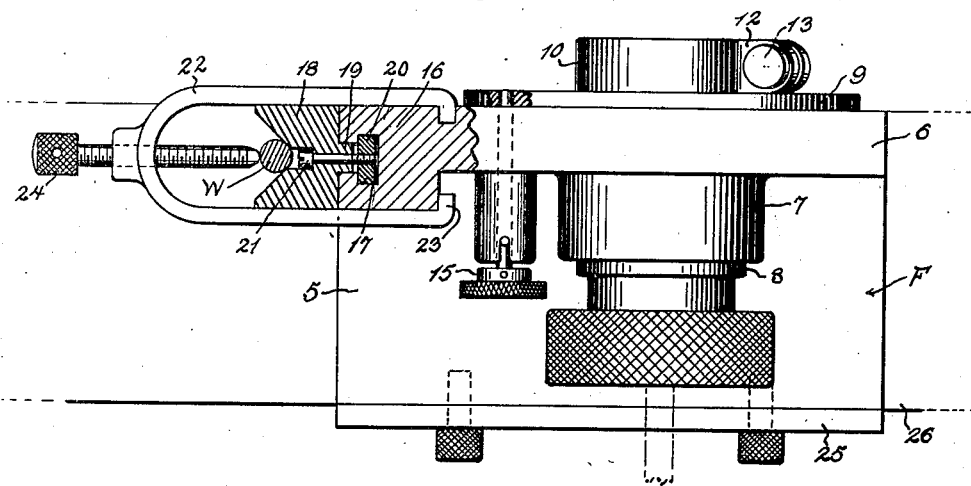
Figure 1 is a top plan view of my improved collet index fixture, parts of the view being shown broken away and in section to illustrate certain structural features.
Figure 2:
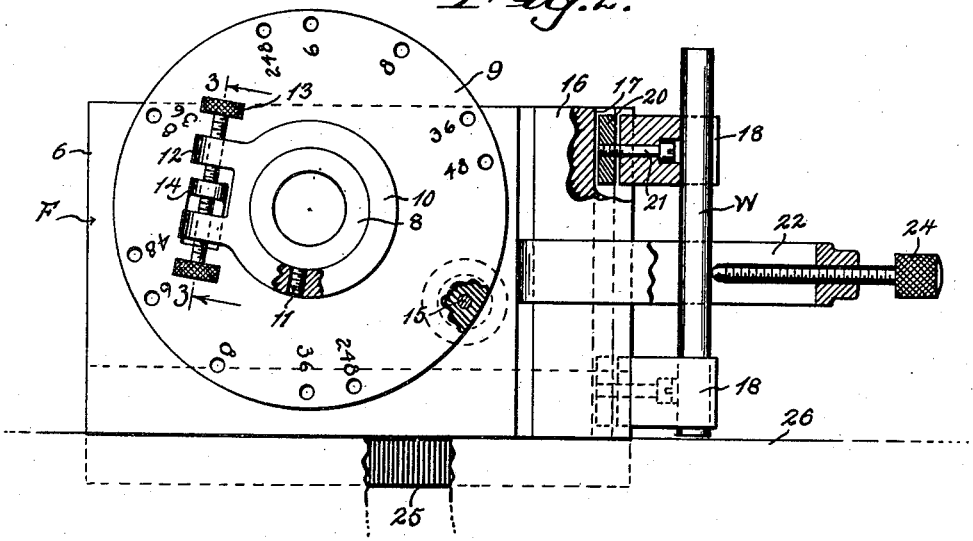
Figure 2 is a front elevational view of the fixture with parts thereof broken away and in section.
Figure 3:
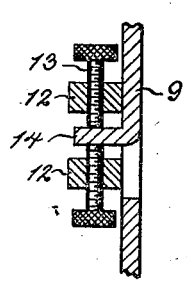
Figure 3 is a fragmentary detail sectional view taken on the line 3—3 of Figure 2 looking in the direction of the arrows.

Referring to the drawing in detail, wherein similar reference characters designate corresponding parts throughout the several views the letter F generally indicates my improved collet index fixture and the same includes a base plate 5 having formed on one longitudinal edge thereof a right-angularly extending wall 6. This wall 6 has formed thereon an enlargement or boss 7 which forms a bearing for rotatably supporting the hollow spindle 8. The spindle 8 extends entirely through the wall 6 and the bearing boss 7 and projects outwardly from the opposite sides of said wall. One end of the spindle is provided with a chuck for clamping the work and to the other end of the spindle has rotatably mounted thereon a dial index plate 9. Fitted upon the spindle 8 against the dial plate 9 is a lock collar 10 and this lock collar is firmly united with the spindle 8 for rotation therewith by a set screw 11. Formed on the collar 10 is a pair of spaced parallel ears 12 each of which receive an adjusting screw 13. These adjusting screws 13 bear against the opposite sides of a lug 14 carried by or formed on the dial plate 9. By tightening and loosening the screws 13 the spindle 8 can be finely adjusted relative to the dial plate. Thus the dial plate 9 and the spindle 8 can be accurately adjusted relative to one another. The dial plate 9 and hence the spindle 8 is held in an adjusted position on the base of the fixture by a plunger or pin 15 (see my pending application). The adjustment of the dial plate 9 and the spindle 8 relative to one another is an improvement over my pending application.

One of the important features of my present invention is the provision of means for clamping work on the base of the fixture at right angles to the spindle 8 and hence I provide on one end of the wall 6 a rib 16. This rib has formed in its outer face a longitudinally extending T shaped guide groove 17. Mounted for sliding movement on the outer edge of the rib 16 are clamping V blocks 18. The inner faces of the V blocks have formed thereon guide shanks 19 which are received within the T shaped groove 17. A key 20 is provided for each V block 18 and this key is fitted in the T shaped groove at right angles to the shanks 19. The keys 20 are united to their V blocks by set screws 21 and by loosening and tightening these set screws the V blocks can be adjusted along the length of the rib 16 to a preferred selected position.

In order to hold the work, such as a rod W, against the V blocks 18 I provide a clamping stirrup 22. This stirrup is of a U shape in plan and is adapted to straddle the rib 16 and the ends of the arms of the stirrup are inturned to provide feet 23 for engaging the rib. The bight portion of the stirrup carries an adjusting screw 24 for engaging the work W between the blocks 18 and obviously by loosening the screw 24, the stirrup clamp can be moved up and down along the rib and by tightening the screw, the clamp 22 and the work will be firmly held in position against movement on the V blocks.

The base plate 5 of the fixture can have detachably connected to one edge thereof a depending plate 25 which facilitates the proper setting of the fixture on a machine chuck 26.

Changes in details may be made without departing from the spirit or the scope of my invention, but what I claim as new is:

1. In a collet index fixture having a base plate and a right-angularly extending wall, a rib formed on one end of said wall, clamp blocks adjustably mounted on the rib, and a clamp stirrup engaging said rib and longitudinally adjustable thereon, and a set screw carried by the stirrup for engaging the work between the clamp blocks.

2. In a collet index fixture having a base plate and a right-angularly extending wall, a rib formed on one end of said wall, clamp blocks slidably mounted on said rib and movable toward and away from each other, adjustable means for holding the blocks in a selected position on the rib, a clamp stirrup straddling said rib and projecting beyond the blocks, and a set screw carried by the end of the stirrup remote from said rib for engaging work held by the blocks.

3. In a collet index fixture having a base plate and a right-angularly extending wall, a rib formed on one end of said wall provided with longitudinally extending T slot opening out one face of the rib, V clamp blocks slidably mounted on said rib, keys for the blocks fitted in the T shaped slot, set screws carried by the blocks engaging the keys, a U shaped clamp stirrup straddling the rib having inturned feet engaging the inner face of the rib, and a set screw carried by the end of the stirrup remote from the feet for engaging work placed on said blocks.

JOSEPH BOCHENEK.